United States Patent [19]

Smith

[11] Patent Number: 4,546,302
[45] Date of Patent: Oct. 8, 1985

[54] PROTECTIVE SENSING MEANS FOR BATTERY CHARGING CIRCUIT

[75] Inventor: Leonard S. Smith, Eden Prairie, Minn.

[73] Assignee: Century Mfg. Co., Minneapolis, Minn.

[21] Appl. No.: 189,118

[22] Filed: Sep. 22, 1980

Related U.S. Application Data

[63] Continuation-in-part of Ser. No. 933,417, Aug. 14, 1978, abandoned.

[51] Int. Cl.³ ............................................... H02J 7/00
[52] U.S. Cl. ........................................ 320/25; 320/40
[58] Field of Search ......................................... 323/276

[56] References Cited

U.S. PATENT DOCUMENTS

| | | | |
|---|---|---|---|
| 2,978,630 | 4/1961 | Tour | 323/273 |
| 3,074,006 | 1/1963 | Klees | 323/276 |
| 3,205,422 | 9/1965 | Gold | 320/39 |
| 3,303,386 | 2/1967 | Murphy | 361/18 X |
| 3,395,317 | 7/1968 | Hanson | 361/18 X |
| 3,571,608 | 3/1971 | Hurd | 307/93 |
| 3,668,545 | 6/1972 | Recklinghausen | 361/91 X |
| 3,670,234 | 6/1972 | Joyce | 361/18 X |

Primary Examiner—Peter S. Wong
Assistant Examiner—Anita M. Ault
Attorney, Agent, or Firm—Leo Gregory

[57] ABSTRACT

This invention relates to a protective circuit which senses and protects a current regulating battery charging circuit against the effects of reverse polarity and short circuiting originating with the battery being charged.

2 Claims, 1 Drawing Figure

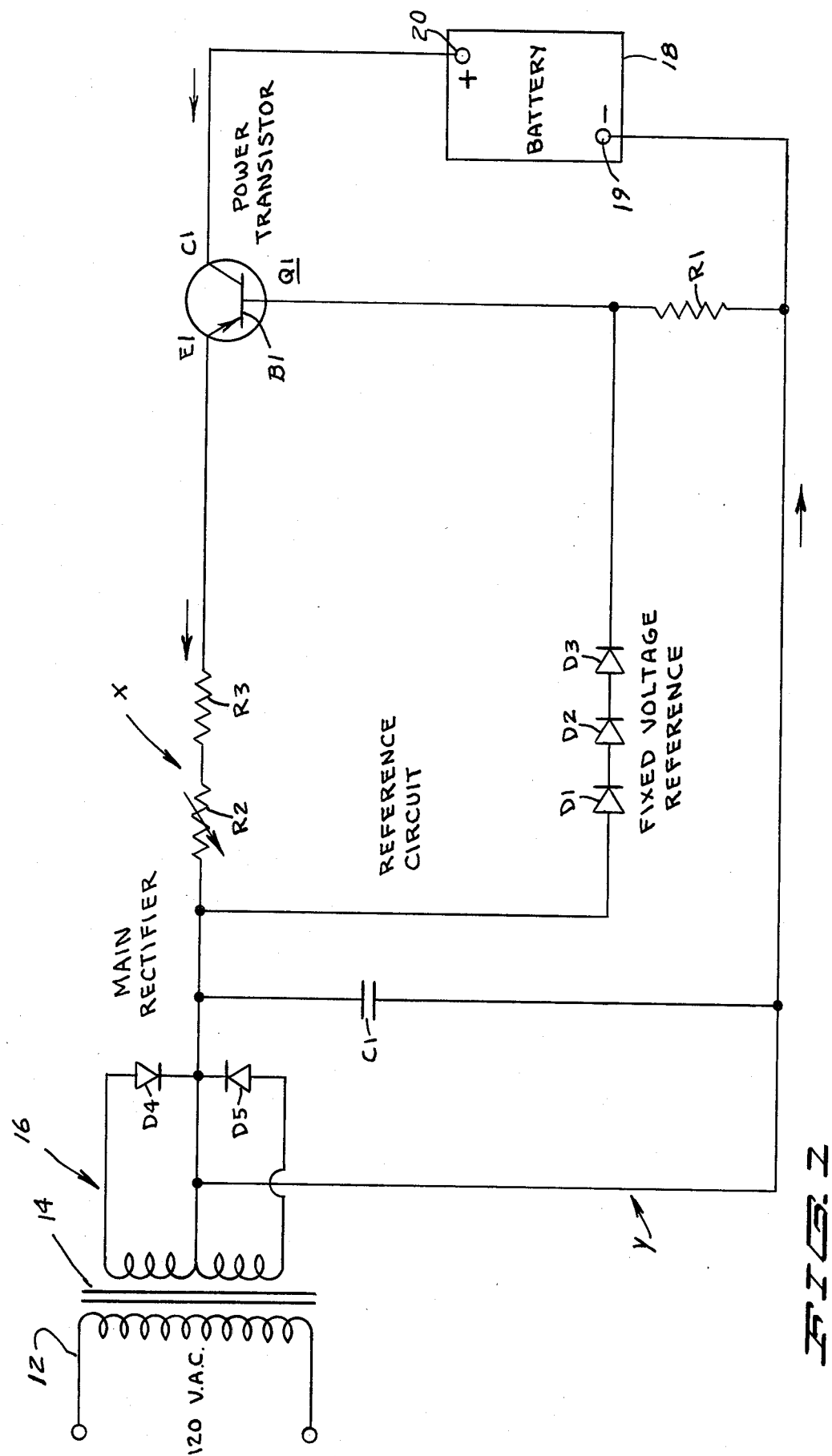

PROTECTIVE SENSING MEANS FOR BATTERY CHARGING CIRCUIT

This application is a continuation-in-part of Ser. No. 933,417 filed Aug. 14, 1978, now abandoned.

BACKGROUND OF THE INVENTION

1. Field of Invention.

This invention relates to the field of electronic circuitry sensing and protecting a battery charging circuit against the effects of reverse polarity and short circuiting originating at the battery.

2. Description of Prior Art.

Circuitry is known in the art as with battery chargers to protect the battery being charged from over-voltage in turning off the charging circuit when a prescribed value of battery voltage is achieved as disclosed in the U.S. Pat. No. 3,205,422 issued to C. M. Gold. The limitation in Gold is that it senses voltage in only one polarity and only in one direction, that is, from the current source only and is incapable in sensing a condition of undesirable power dissipation resulting from a reverse polarity or a short circuiting condition originating with the battery being charged.

Disclosed also in U.S. Pat. No. 3,571,608 issued to Edward T. E. Hurd, III, is a protective circuit essentially the same as that disclosed by Gold and relates only to current from the current source but does not have the capability of sensing the undesirable conditions originating with the battery being charged as above indicated.

In U.S. Pat. No. 3,668,545 to Daniel R. VonRecklinghausen, there is provided means to measure excess voltage from the input source as determined by an over-voltage protector but there is no capability here for protecting against over-voltage developing in the output current side of the circuitry. In the disclosure of this patent there is no need to protect against a current condition developing in a load as no load is contemplated here which could become a source of power. This patent provides no teaching having to do with a voltage drop caused by a condition having to do with the output of the current and originating with the load.

In the U.S. Pat. No. 3,074,006 issued to G. N. Klees, there is a disclosure having to do with the supply current to a load but there is no teaching present for protection against a problem in voltage drop originating with the load.

SUMMARY OF THE INVENTION

This invention relates to electronic means providing a protective circuit to sense and protect a battery charging circuit against undesirable power dissipation originating with a battery being charged and resulting from the battery becoming short circuited or reversely connected.

More specifically, it is an object of this invention to provide a protective circuit sensing a short circuiting condition or a condition of reverse polarity originating with a battery being charged wherein the resulted undesirable dissipation of power will be sensed by the protective circuit and such power dissipation will be caused to bypass the charging circuit until the condition of defect has been corrected and thus the charging circuit is saved from damage.

It is a further object of this invention to provide a protector circuit which forms a path across the emitter-collector load circuit of the transistor of the charging circuit that as to conditions of short circuiting or reverse polarity originating as with a battery being charged, the components of the protective circuit are such that when the power dissipation from a battery being charged exceeds a given value of voltage that the transistor will be caused to be in a state of such high resistance as to virtually stop current flowing across its emitter-collector path until the defect has been corrected and until such time as the defect has been corrected a bypass path is provided comprising a protective circuit.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a schematic wiring diagram of the invention herein.

DESCRIPTION OF A PREFERRED EMBODIMENT

For purpose of illustration to put the invention herein within its operating environment, a current flow regulation circuit X-Y is shown which includes a conventional power source 12, a transformer 14 with diodes D4 and D5 in connection with a capacitor C1 forming a rectifier which taken compositely are indicated as forming a battery charger 16. A battery 18 is shown having terminals 19 and 20.

The circuit X-Y includes a series power transistor Q1 having a load circuit emitter E1-collector C1 and has its base B1 biased through a resistor R1 and has in connection therewith a fixed voltage reference comprising diodes D1, D2 and D3. Current flow is adjusted by the inclusion of a variable resistor R2 in series with a variable resistor R3.

The subject matter of the invention herein comprises a protector or protective circuit Z designed to protect the power transistor Q1 from damaging power dissipation.

In the event of a reverse polarity or short circuiting connection at the battery terminals 19 and 20, the voltage supplied by the battery charger would add to the battery voltage, the transistor would become very hot as it would be the only element in the circuit dissipating power and unless it were a large relatively expensive transistor, it would burn up and become inoperative. The damage caused by the conditions of short circuiting or reverse polarity at the battery is avoided by the use of the protector circuit as hereinafter described.

The protector circuit Z forms a path across the emitter E1-collector C1 load circuit of the transistor Q1 is shown consisting of a current limiting resistor R4, a zener diode DZ1 and the base B2 and emitter E2 junction of a protector transistor Q2. Said zener diode will have a value of a predetermined reference voltage.

With respect to the conditions of short circuiting or reverse polarity herein above described, the components of circuit Z are selected to be of a design to influence said transistor Q1 such that when the voltage drop between said emitter E1 and collector C1 exceeds the voltage of the zener diode DZ1 that current will flow through said resistor R4, the zener diode DZ1 and the base B2 of said transistor Q2 to cause said transistor Q2 to conduct, thus shunting current from the base B1 of the transistor Q1 and causing the transistor Q1 to be in a state of such high resistance as to virtually stop current flow across said emitter E1-collector C1 path until the fault causing the voltage drop has been corrected.

To avoid sporadic triggering of the circuit Z with respect to transient voltage peaks, said circuit Z is designed in influencing the transistor Q2 to have a resonse time slower than the response time of the transistor Q1 and thus for such non-damaging causes which may occur the circuit Z will not influence the resistor Q1 and will not effect its conductivity.

For the purpose of slowing down the response time of transistor Q2, a resistor R5 is provided as a base stablizing resistor for the base B2 and a capacitor C2 is provided between the emitter E2 and the base B2 of said transistor Q2. The product of the capacitor C2 and resistor R4 essentially determine the response time of the transistor Q2.

Thus the protector circuit Z very efficiently prevents undesirable power dissipation in the transistor Q1 in the event of a condition originating at the battery of short circuiting or reverse polarity and thus there is provided a very inexpensive highly reliable protective circuit which permits the use of inexpensive electronic components in the battery charging circuit. Said protector circuit has proved to be reliable and successful in operation.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A circuit protecting a current regulating battery charger from a condition of short circuiting or reverse polarity originating at the battery, the charging circuit included consisting of a power transistor in circuit with an emitter-collector load circuit and a base, the protector circuit comprising a reference voltage sensing means and the base and emitter junction of a protector transistor forming a path across said load circuit of said power transistor, said means having a predetermined reference voltage sensing a voltage drop across said load circuit of said power transistor caused by a condition at the battery, said protector transistor having an input to the base of said power transistor, and said reference voltage sensing means causing said protector transistor to bias said base of said power transistor to shunt current in excess of said reference voltage.

2. A circuit protecting a current regulating battery charger from a voltage drop caused by a condition of short circuiting or reverse polarity originating at the battery, the battery charging circuit included consisting of a power transistor having an emitter-collector load circuit and a base, the protector circuit comprising a path across the load circuit of said power transistor, said path consisting of a current limiting resistor, a zener diode and the base-emitter junction of a protector transistor, said zener diode having a value of a predetermined reference voltage sensing a voltage drop across said load circuit of said power transistor caused by a condition originating at the battery, said protector transistor having an input to the base of said power transistor, and said protector transistor biasing the base of said power resistor shunting current from the same causing the load circuit thereof to become nonconductive during the time that said voltage drop thereacross exceeds the value of said reference voltage.

* * * * *